(12) United States Patent
Agrawal et al.

(10) Patent No.: US 11,615,174 B2
(45) Date of Patent: Mar. 28, 2023

(54) METHOD AND A SYSTEM TO LOCALLY STORE AND AUTHENTICATE A DATA OF A USER

(71) Applicant: Biocube Technologies Inc., Dover, DE (US)

(72) Inventors: Subodh Narain Agrawal, London (GB); Anil K. Sharma, Middlesex (GB)

(73) Assignee: Biocube Technologies Inc, Dover, DE (US)

( * ) Notice: Subject to any disclaimer, the term of this patent is extended or adjusted under 35 U.S.C. 154(b) by 189 days.

(21) Appl. No.: 16/996,350

(22) Filed: Aug. 18, 2020

(65) Prior Publication Data

US 2021/0165862 A1 Jun. 3, 2021

Related U.S. Application Data

(60) Provisional application No. 62/894,021, filed on Aug. 30, 2019.

(51) Int. Cl.
*G06F 21/32* (2013.01)
*G06F 16/23* (2019.01)

(52) U.S. Cl.
CPC .......... *G06F 21/32* (2013.01); *G06F 16/2379* (2019.01)

(58) Field of Classification Search
CPC ...... G06F 21/32; G06F 21/62; G06F 21/6209; G06F 21/6218; G06F 16/2379
See application file for complete search history.

(56) References Cited

U.S. PATENT DOCUMENTS

| 2014/0363057 A1* | 12/2014 | Eckel .................. G06V 30/418 382/116 |
| 2017/0257358 A1 | 9/2017 | Ebrahimi et al. |
| 2018/0255045 A1 | 9/2018 | Cicchitto |

OTHER PUBLICATIONS

World International Patent Office (WIPO), International Search Report and the Written Opinion of the International Searching Authority for PCT/US2020/058427, dated Feb. 1, 2021, 6 pages.

\* cited by examiner

*Primary Examiner* — Malcolm Cribbs
(74) *Attorney, Agent, or Firm* — Douglas J. Ryder; Ryder, Mazzeo & Konieczny LLC (57) ABSTRACT

An authentication system is disclosed here to locally store and authenticate user data associated with a user. The authentication system comprises a biometric engine, a local database, a requesting module, and an authentication engine. The biometric engine stores biometric identification of the user for registration, which is retrieved using a user owned mobile device. The local database stores the user data associated with the user after the registration, and is in communication with the biometric engine via a client application. The requesting module is in communication with a processor to request an authentication of the user data, which is accepted if the request matches the identified user data. The authentication engine authenticates the user data by verifying the user data against one or more of the biometric identifications, and generate an authentication message that is sent to a proprietor that requests for the authentication of the user data.

6 Claims, 7 Drawing Sheets

METHOD AND A SYSTEM TO LOCALLY STORE AND AUTHENTICATE A DATA OF A USER

TECHNICAL FIELD

The present invention relates to the field of data authentication and data privacy, more specifically related to method and system for biometric authentication of user identity, financial and non-financial transactions and electronic documents with user authorization at the user device. In other words, method and system associated with Biometrics and Artificial Intelligence domain that provides identity verification to approve access and transactions as well as identity with transactional risk and fraud mitigation.

BACKGROUND

At present, the traditional way of protecting and securing the personal identity, transactions, documents and data of the user is provided via different kinds of external/private/public databases, whether integrated or distributed, that store such electronic information at third party servers. Such servers are secured in a secured distributed information system that isolates interaction from terminals to specific personal vaults. A secure connection server is coupled to the system to enable authentication of a user and the data within the database is protected against disclosure by encryption, against tampering by digital signatures and against untrusted communications with unknown parties by digital certificates.

Hence, the present scenario consists of solutions that look at limited niches or verticals. Even those that are multimodal focus on usually 2 modes of verification. This means that there is ultimately a maximum of 3 verification combinations of which 2 are uni-modal, and therefore, the dexterity and reliability is lower. Furthermore, the integration with transactional or outcome-based systems and processes is limited and if at all present in uni-dimensional. As an example, people spend billions of hours each year in queues. A Timex study showed that Americans spend 37 billion hours each year waiting in line, which is 117 hours a year. Britons were estimated by Visa Contactless as spending 18 hours a year queuing for services. It's not just the productivity loss to both customers and businesses, long queues result in lost sales and reduced customer satisfaction.

To add to the queues, most processes require physical documents including forms, identity papers, tickets and payment instruments. IDC, the premier global market intelligence firm, estimated that there are more than 4 trillion documents in the US alone and they are growing at 22% a year. 75% of time is spend working with paper documents is spent on searching and filing, but 7.5% of them get lost and 3% are misfiled. Given that it costs $20 in labor to file a document and then $120 and $220 respectively to find a misfiled document and to reproduce a lost document, approximately US$32 trillion can be saved by making processes paperless. Consumers want the convenience of a fast, inexpensive and secure way to transact seamlessly, whether its related to documentation, transaction or access. While there are various providers that are offering services, they have their own problems: addressing only some niches, hardware intensive and difficult to integrate. Customers need a better option.

Although most of the known solutions provide a level of security for access to data, the security is not based on personalized security features and is therefore open to tampering by person of unscrupulous nature. Electronic or digital signatures were well known for the protection and authentication of electronic documents, which consists of an electronic code associated with a document that verifies the identity of the signer of the document. Such electronic signatures rely on public-key cryptography and hash functions to provide this verification.

These techniques allow a level of security to be applied to documents that are transferred between two or more persons or parties. Since, the private key is electronically stored locally by the user in his or her personal device or within a smart card belonging to that user, there arises the possibility that an unscrupulous person might gain access to such a key by gaining access to personal device or smart card of the user.

Furthermore, the security of personal documents or data of the user is improved by providing vault systems that require biometric authentication from the user instead of digital signatures. This in turn provide a secure layer on top of electronic signature algorithms. In case of such vault systems, the personal documents or data of the user is stored in a cloud or server that belongs to any other party than user itself. However, such documents or data are still transferred from the user to the third-party server at least for storing it in first place. Therefore, there still exists a possibility of tampering of the documents or data as submitted by an unscrupulous person.

Accordingly, it is an object of the present invention to provide a safe and secured method and system of authentication of personal documents or data of the user at user device without sharing or storing such documents or data with third party servers.

SUMMARY OF THE INVENTION

The following presents a simplified summary of the subject matter in order to provide a basic understanding of some aspects of subject matter embodiments. This summary is not an extensive overview of the subject matter. It is not intended to identify key/critical elements of the embodiments or to delineate the scope of the subject matter. Its sole purpose to present some concepts of the subject matter in a simplified form as a prelude to the more detailed description that is presented later.

It is therefore a primary objective of this invention is to provide a safe and secured method and system of biometric authentication of personal documents or data of the user at user device without sharing or storing such documents or data with third party servers.

An authentication system and a method associated with the authentication system is disclosed here to locally store and authenticate user data. The authentication system comprises a biometric engine, a local database, a requesting module, and an authentication engine. The biometric engine stores at least one biometric identification of the user for registration, and the biometric identification is retrieved using user owned device. The local database stores the data associated with the user within the user owned device after the registration, and the local database is in communication with the biometric engine via a client application. At least one processor is coupled with the local database. The requesting module is in communication with the processor to request an authentication of the user data, and the request is accepted if the request matches the identified user data. The authentication engine is in communication with the processor to authenticate the user data by verifying the user data against one or more of the biometric identifications, and generate an authentication message that is sent to a proprietor that requests for the authentication of the user data. The authentication engine verifies the data of the user in real time.

In an embodiment, the stored user data is identified in the local database to verify authenticity. In an embodiment, the biometric engine is configured to capture one or more types of the biometric identifications related to the user using the user owned handheld mobile device. In an embodiment, after completing the registration, the user uploads the user data, and wherein the user data is stored in the local database of the user device. In an embodiment, the user data is identified based on type of document and verifying electronically against source systems to establish authenticity, after the uploading of the user data.

A non-transitory computer program product is also disclosed here to locally store and authenticate user data, when executed by a computer. The computer program product comprises programmed codes to perform the method steps. The first programmed code is to store at least one biometric identification of the user in a biometric engine for registration, where the biometric identification is retrieved using a user owned mobile device. The second programmed code is to store the user data in a local database on user device after the registration, where the local database is in communication with the biometric engine via a client application.

The third programmed code is to process stored instructions in the local database via at least one processor coupled with the local database. A first stored instruction is to request, via a requesting module, an authentication of the user data, where the request is accepted if the request matches the identified user data. The second stored instruction is to authenticate the user data via an authentication engine, where the authentication engine verifies the user data against one or more of the biometric identifications. The third stored instruction is to generate an authentication message via the authentication engine and sending the authentication message to a proprietor that requests for the authentication of the user data, in response to the verification of the user data.

These and other objects, embodiments and advantages of the present invention will become readily apparent to those skilled in the art from the following detailed description of the embodiments having reference to the attached figures, the invention not being limited to any particular embodiments disclosed.

BRIEF DESCRIPTION OF FIGURES

The foregoing and further objects, features and advantages of the present subject matter will become apparent from the following description of exemplary embodiments with reference to the accompanying drawings, wherein like numerals are used to represent like elements.

It is to be noted, however, that the appended drawings along with the reference numerals illustrate only typical embodiments of the present subject matter, and are therefore, not to be considered for limiting of its scope, for the subject matter may admit to other equally effective embodiments.

DETAILED DESCRIPTION

Exemplary embodiments now will be described with reference to the accompanying drawings. The disclosure may, however, be embodied in many different forms and should not be construed as limited to the embodiments set forth herein; rather, these embodiments are provided so that this disclosure will be thorough and complete, and will fully convey its scope to those skilled in the art. The terminology used in the detailed description of the particular exemplary embodiments illustrated in the accompanying drawings is not intended to be limiting. In the drawings, like numbers refer to like elements.

It is to be noted, however, that the reference numerals used herein illustrate only typical embodiments of the present subject matter, and are therefore, not to be considered for limiting of its scope, for the subject matter may admit to other equally effective embodiments.

The specification may refer to "an", "one" or "some" embodiment(s) in several locations. This does not necessarily imply that each such reference is to the same embodiments), or that the feature only applies to a single embodiment. Single features of different embodiments may also be combined to provide other embodiments.

As used herein, the singular forms "a", "an" and "the" are intended to include the plural forms as well, unless expressly stated otherwise. It will be further understood that the terms "includes", "comprises", "including" and/or "comprising" when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include operatively connected or coupled. As used herein, the term "and/or" includes any and all combinations and arrangements of one or more of the associated listed items.

Unless otherwise defined, all terms (including technical and scientific terms) used herein have the same meaning as commonly understood by one of ordinary skill in the art to which this disclosure pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The figures depict a simplified structure only showing some elements and functional entities, all being logical units whose implementation may differ from what is shown. The connections shown are logical connections; the actual physical connections may be different. It is apparent to a person skilled in the art that the structure may also comprise other functions and structures.

Also, all logical units described and depicted in the figures include the software and/or hardware components required for the unit to function. Further, each unit may comprise within itself one or more components which are implicitly understood. These components may be operatively coupled to each other and be configured to communicate with each other to perform the function of the said unit.

In general, the client application associated with the authentication system disclosed here is, for example, a mobile based application that is further based on one or a combination of biometric, financial, transactions vault. In an example, the client application is essentially used for identity verification and paperless transaction. The key use cases include, for example, visa applications and immigration, contactless check-in\checkout and payment at hotels, facility access for workers and visitors, events access such as sports events, entertainment events, etc., access and authorizations at transit hubs that comprise airports, train stations, metros, etc., including purchasing of services, tickets, peer to peer (P2P) payments, etc.

Figure 1:
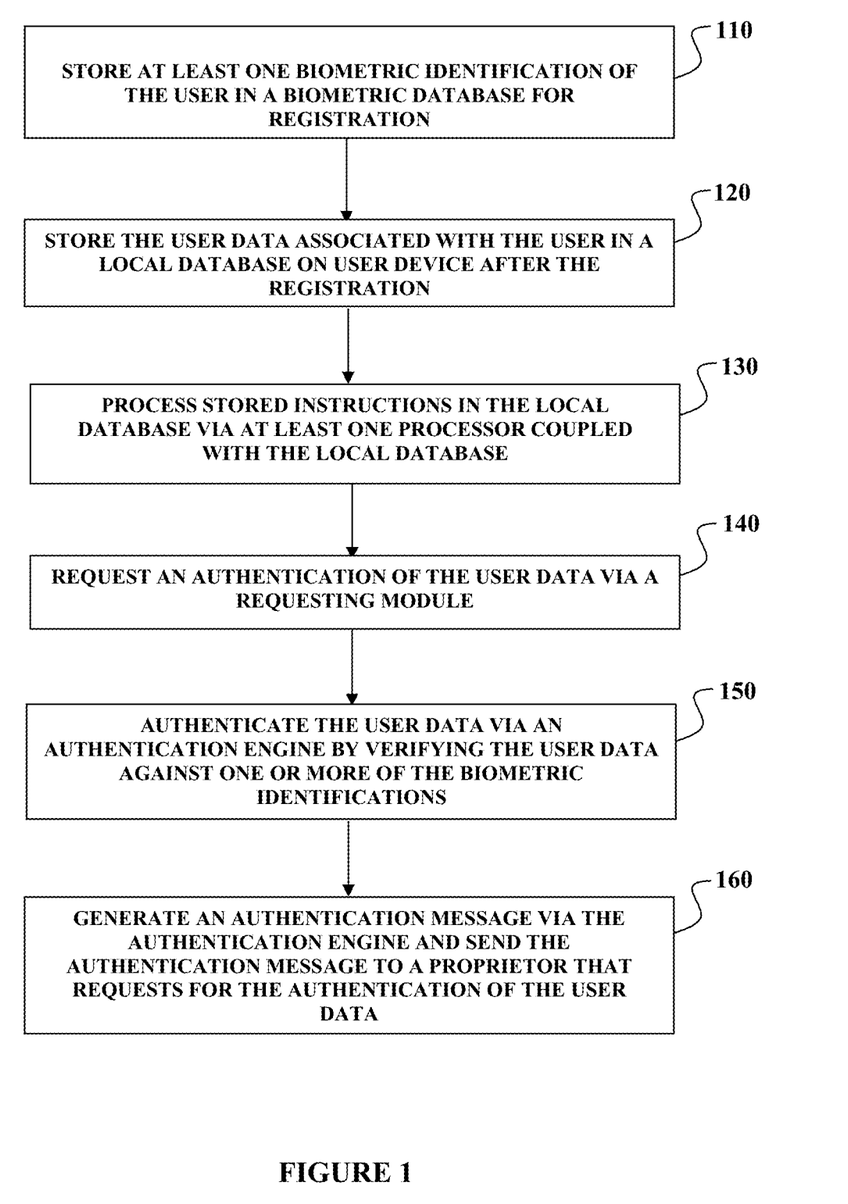
FIG. 1 illustrates a method by which the authentication system is implemented according to an embodiment.
Figure 2:
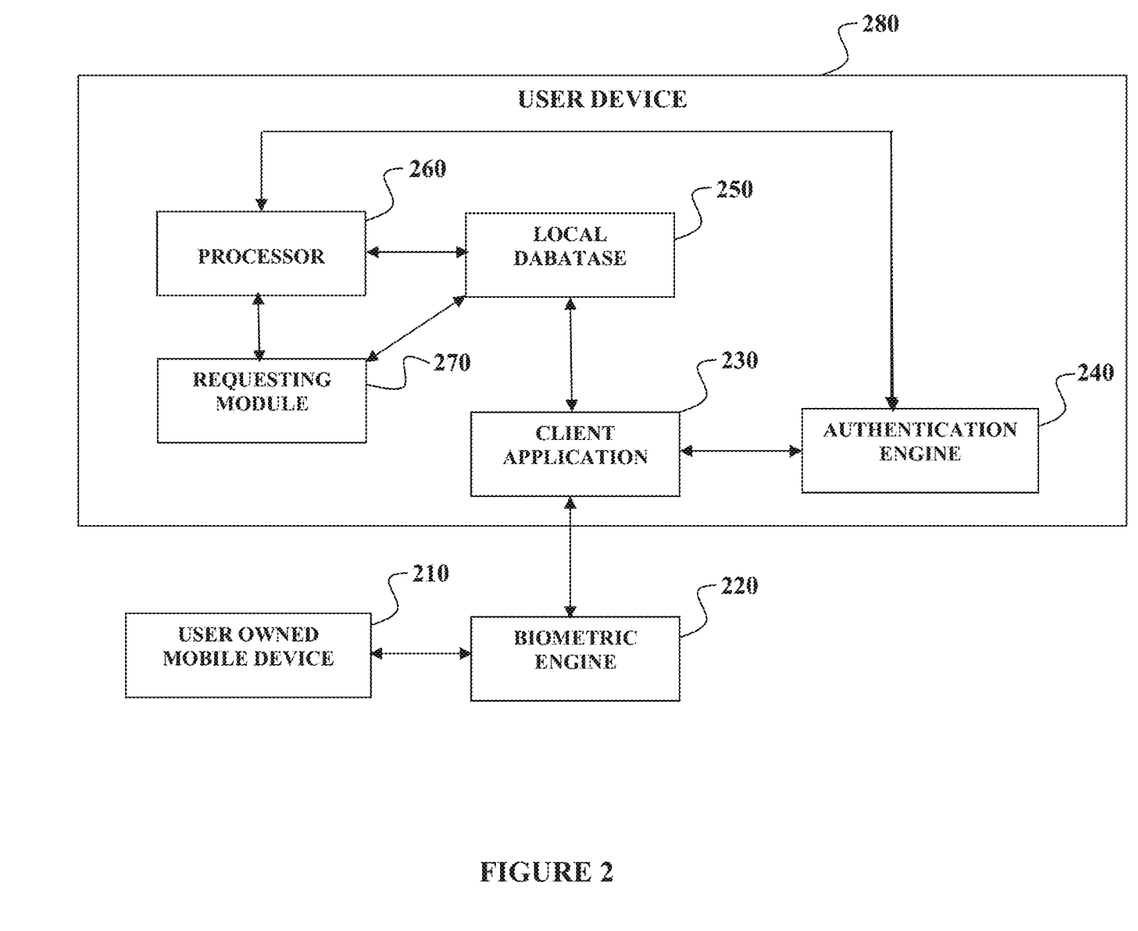
FIG. 2 illustrates an authentication system architecture that applies the method described in FIG. 1.

FIGS. 1 and 2 refer to an example methodology 100 and an authentication system 200 that uses the methodology 100 respectively, which is disclosed for locally storing and authenticating a user data associated with the user. The authentication system 200 comprises a biometric engine 220, a local database 250, a requesting module 270, and an authentication engine 240. The biometric engine 210 stores 110 at least one biometric identification of the user for registration, where the biometric identification is retrieved using a user owned device 210. The biometric engine 220 captures one or more types of the biometric identifications related to the user using the user owned device 210. After completing the registration, the user uploads the user data to he stored in the local database 250 of the user device 280. The user data is identified based on type of document and verifying electronically against source systems to establish authenticity, after the uploading of the user data.

Therefore, the local database 250 stores 120 the user data in a user device 280 after the registration, where the local database 250 is in communication with the biometric engine 220 via a client application 230. In an embodiment, the stored user data is identified in the local database 250 to verify authenticity. A least one processor 260 is coupled with the local database 250 to process 130 stored instructions. The requesting module 260 is in communication with the processor 260 to request 140 an authentication of the user data, and the request is accepted if the request matches the identified user data. The authentication engine 240 is in communication with the processor 260 to authenticate 150 the user data by verifying the user data against one or more of the biometric identifications. Finally, the authentication engine 240 generates 160 an authentication message that is sent to a proprietor that requests for the authentication of the user data. The authentication engine 240 verifies the data of the user in real time.

In other words, first the user registers himself using the client application 230 by providing at least one biometric identification that is associated with the user that gets stored in a biometric engine 220. The biometric engine 220 captures one or more types of biometric identifications related to the user. Upon successful registration, the user uploads the personal documents, or in other words the user data that is uploaded to be stored in the local database 250 maintained by the user on his or her own user device 280. Such local database 250 is coupled with the biometric engine 220 through the client application 230 to identify data related to a particular user. After uploading the user data, the user data is categorized or uniquely identified according to the type of document and is verified electronically and securely against source systems to establish authenticity. For example, personal documents such as user identity documents or financial documents are categorized uniquely. A uniquely identified request for authentication of the user data is sent by a proprietor, which is allowed if such request matches with the uniquely identified user data. To authenticate the user data, the authentication engine 240 verifies the user data against the one or more biometric identifications of users that is stored in the biometric engine 220. If the verification is successful, an authentication message is generated by the authentication engine 240 and is sent to the proprietor.

Based on the FIGS. 1 and 2, a non-transitory computer program product is also disclosed here to locally store and authenticate user data, when executed by a computer. The computer program product comprises programmed codes to perform the method steps as shown in FIG. 1. The first programmed code is to store 110 at least one biometric identification of the user in a biometric engine 220 for registration, where the biometric identification is retrieved using a user owned mobile device 210. The second programmed code is to store 120 the user data in the local database 250 on user device 280 after the registration, where the local database 250 is in communication with the biometric engine 220 via a client application 230.

The third programmed code is to process 130 stored instructions in the local database 250 via at least one processor 260 coupled with the local database 250. A first stored instruction is to request 140, via a requesting module 270, an authentication of the user data, where the request is accepted if the request matches the identified user data. The second stored instruction is to authenticate the user data via an authentication engine 240, where the authentication engine 240 verifies the user data against one or more of the biometric identifications. The third stored instruction is to generate an authentication message via the authentication engine 240 and sending the authentication message to a proprietor that requests for the authentication of the user data, in response to the verification of the user data.

Figure 3:
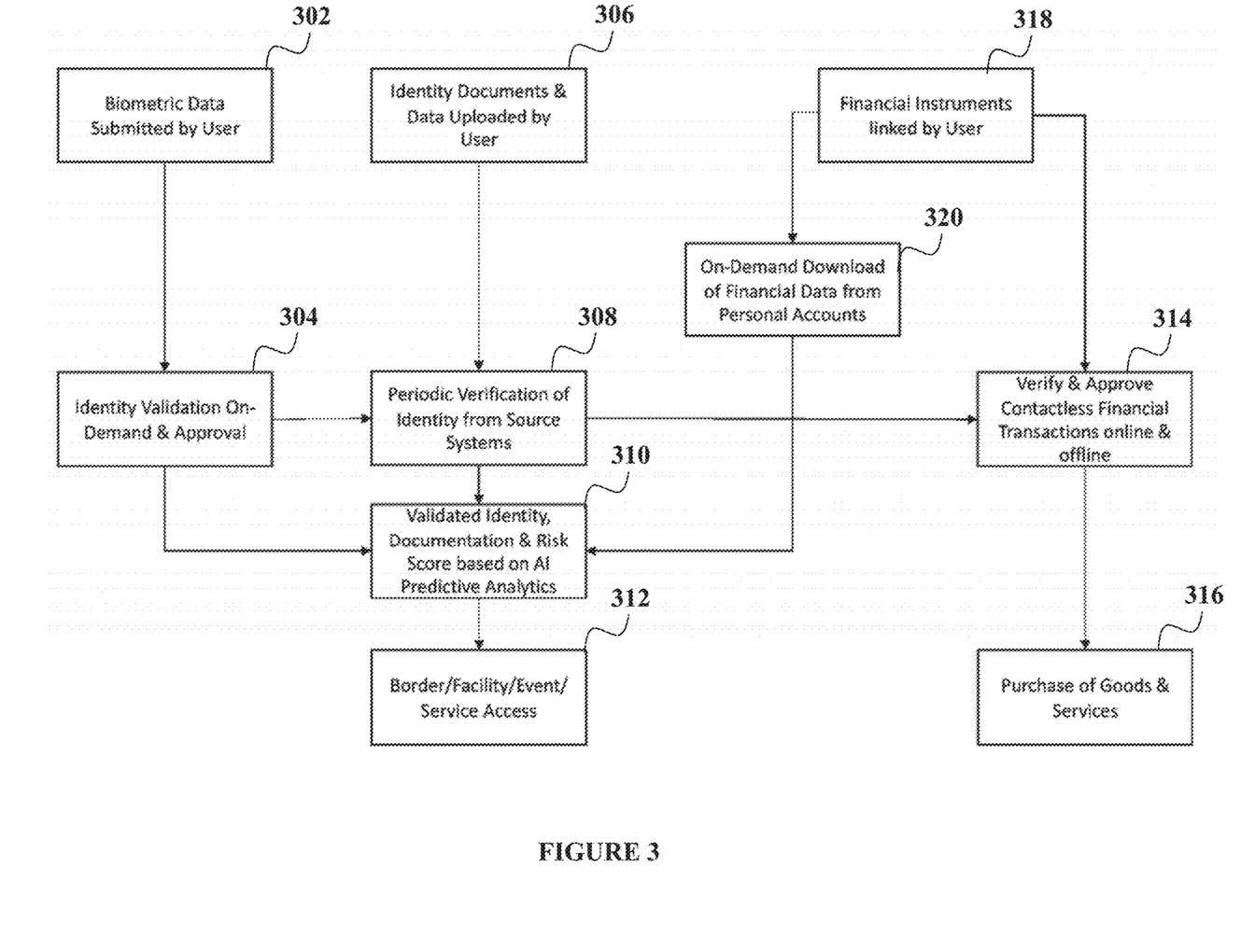
FIG. 3 illustrates a workflow associated with the authentication system.

FIG. 3 illustrates a workflow associated with the authentication system 200. The user submits a biometric data that includes one or more biometric identifications of the user, as referenced at 302. The identity is validated on demand and approved by the authentication system 200, as referenced at 304. Simultaneously, the user uploads user data that includes the identity documents to the local database 250, as referenced at 306. Now, the identity is periodically verified from source systems using the authentication engine 240, as referenced at 308. Simultaneously, the documentation of the biometric identification and corresponding user data is performed and a risk score is assigned to the user based on an Artificial Intelligence (AI) Predictive analysis, after the validation of the identity as referenced at 310. If the identification by comparison of the biometric identifications with the user data using the authentication engine 240 is successful, then the user is provided access to border, facilities and events, as referenced at 312.

During the validation of the identity at 310, the authentication system 200 tracks the financial instruments linked by the user as referenced at 318, and if required, an on-demand download of financial data from personal accounts is performed as referenced at 320. The on-demand download is performed to further verify the documentation of the user data and the biometric identifications and to assign the risk score assignment based on the AI predictive analysis before providing access to border, facilities and events, as referenced at 312. In another embodiment of the authentication system 200, after the periodic verification of the identity from source systems as referenced at 308, when there is successful match of the biometric identifications with the user data, the user is verified and approved to perform contactless financial transactions online and off-line at 314, and therefore, the user is also given access to purchase goods and services as referenced at 316.

Figure 4:
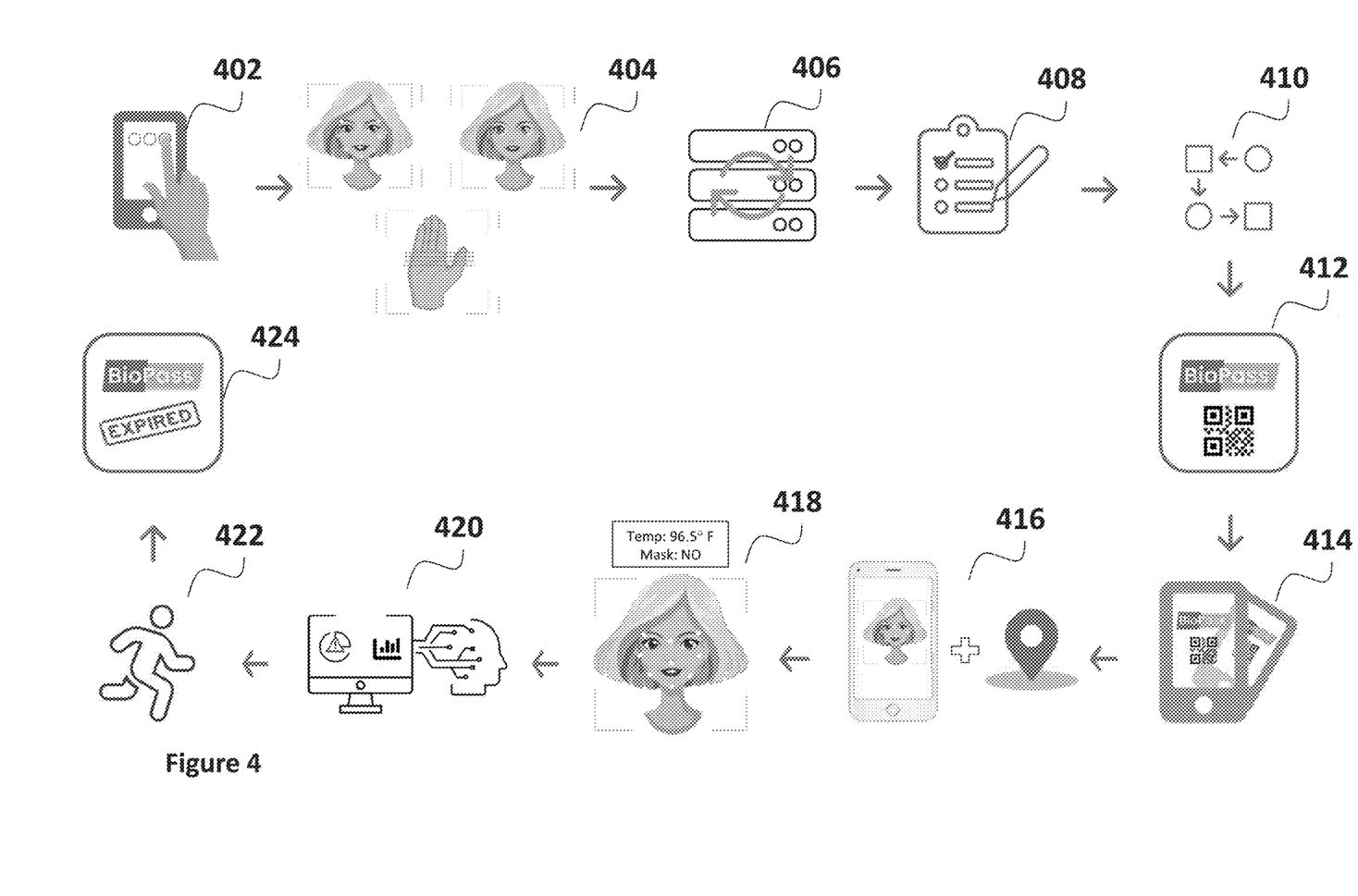
FIG. 4 illustrates a schematic flow diagram that shows the workflow in application of the authentication system in biometric access management.

FIG. 4 illustrates a schematic flow diagram that shows the workflow in application of the authentication system 200 in biometric access management 400. In an example embodiment of biometric access management 400, the visitor or the user registers on the client application 230 installed on their user device 280, for example, mobile device, prior to the visit at an entry gate, as referenced at 402. The user then registers biometric identification on his or her mobile phone, as referenced at 404. The user then provides user data that includes documents that contain ID details that are verified from a government source database as referenced at 406. Hereafter, the user applies for a pass for the preferred slot with health status and details of the person to meet and the purpose of the meeting is also mentioned, as referenced at 408. As discussed in the previous workflow, a multilevel approval process is initiated with AI decision support, as referenced at 410. If this request is approved based on matching of the biometric identification and the user data via the authentication engine 140, then the bio pass is granted as referenced at 412. The Bio pass that is received on the user's mobile phone is shown to the security personnel where the scanning of the user's bio pass QR code is performed, as referenced at 414. The use of bio pass authenticates itself using their own mobile phone along with geo-location that is recorded, as referenced that 416, Now, an integrated thermal imaging system is used for screening, as referenced at 418, which is followed by performing a predictive AI enabled risk analysis and real-time alerts on a dashboard as a referenced that 420. If the predictive AI enabled risk analysis is favorable for the user, then the user is provided authorized access for any business transaction, as referenced at 422. The pass expires as the user exits at checkout, as referenced at 424.

Figure 5:
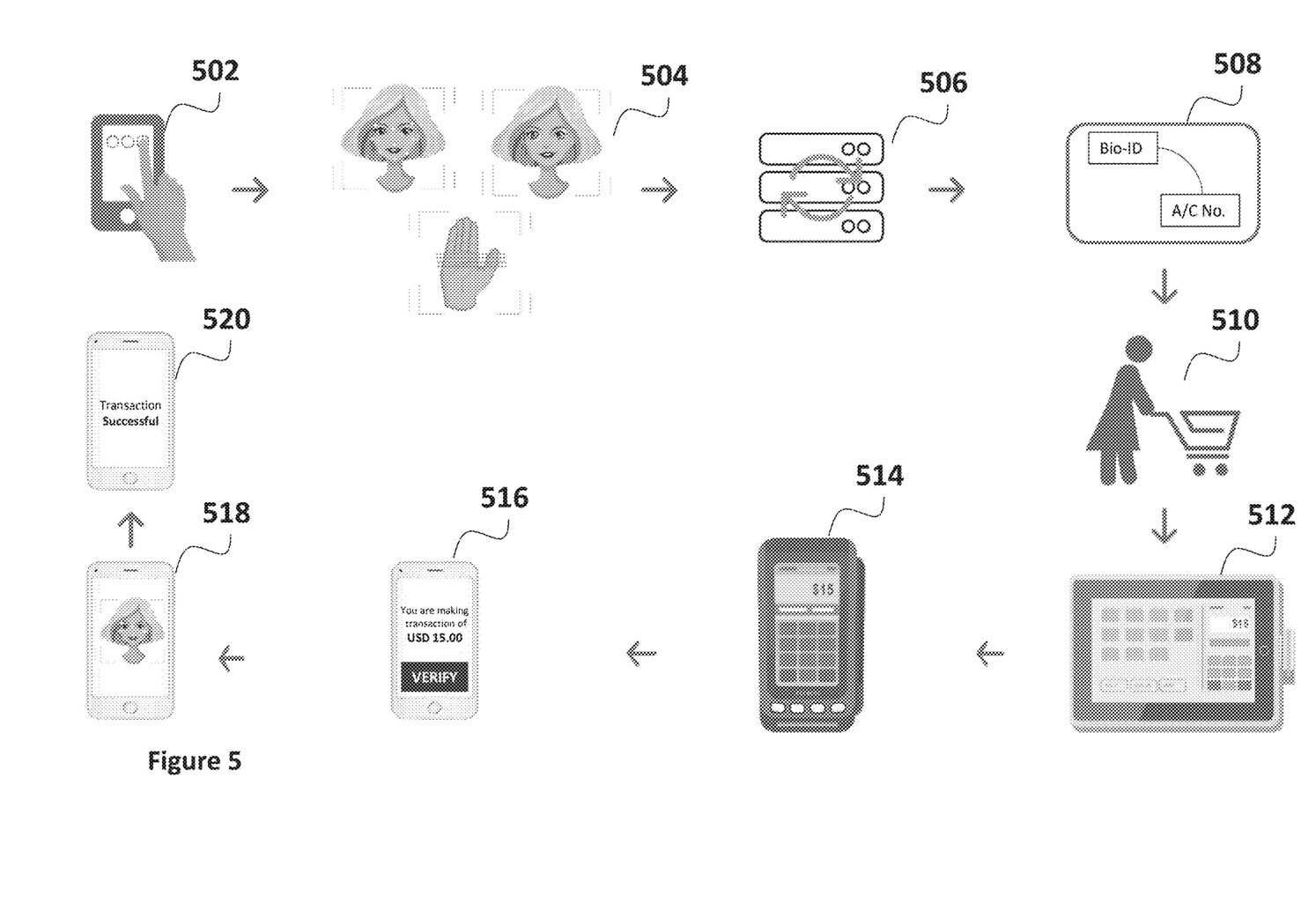
FIG. 5 illustrates a schematic flow diagram that shows the workflow in application of the authentication system in biometric fraud-free transactions.

FIG. 5 illustrates a schematic flow diagram that shows the workflow in application of the authentication system 200 in Biometric Fraud-free Transactions. The user registers on the bank application that is powered by the client application 230 as referenced at 502. Now the user registers biometric identification on their mobile phone, which is stored in the biometric engine 220, as referenced at 504. Now, the user provides user data that includes ID details from a government verified source database as referenced at 506, which is stored in the local database 250. Now the user data or the bio ID is mapped with their account number with the bank, as referenced at 508. The user then reaches a POS, where merchant is not registered on POS, as referenced at 510. For the users that are willing to pay through bio pay, the merchant chooses bio pay payment method on POS, as referenced at 512. Now the user is supposed to scan the QR code at the POS, as referenced at 514, which is followed by the user filing transaction amount and payment details, as referenced at 516. Now the user performs self-bio authentication using their own mobile phone as a referenced at 518, which is followed by a successful security transaction, as referenced at 520.

Figure 6:
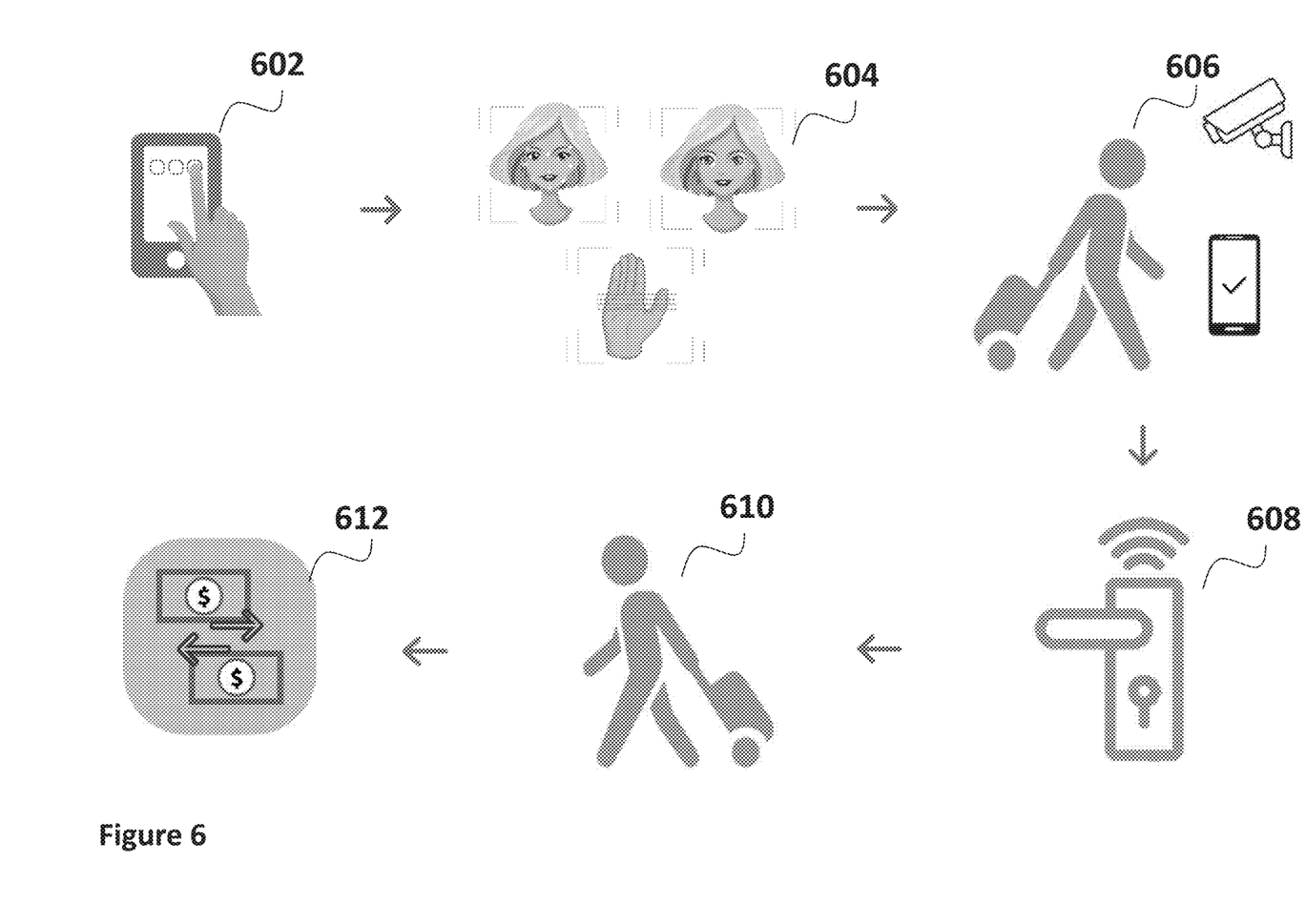
FIG. 6 illustrates a schematic flow diagram that shows the workflow in application of the authentication system in contactless check-in or checkout.

FIG. 6 illustrates a schematic flow diagram that shows the workflow in application of the authentication system 200 in Contactless Check-in or Checkout. The uses book a hotel room through the client application 230 installed on his or her mobile phone to check for a booking ID as referenced at 602. Now, a Biometric self 'Know Your Customer' (KYC) with source authentication is performed, as referenced at 604. After a successful bio verification, the user checks-in at the hotel, as referenced at 606. The user is allowed to go directly to the selected room in the hotel using their biometric access, as referenced at 608. An automatic checkout along with extension options are already provided in the client application 230 using the biometric access, as referenced at 610. Now, when the user is supposed to pay the bills, an integrated payment of bill settlement is performed based on the biometric access, as referenced at 612. This way the user analytics is easily gathered and the usage of the client application 230 provides seamless check-in and check-out.

Figure 7:
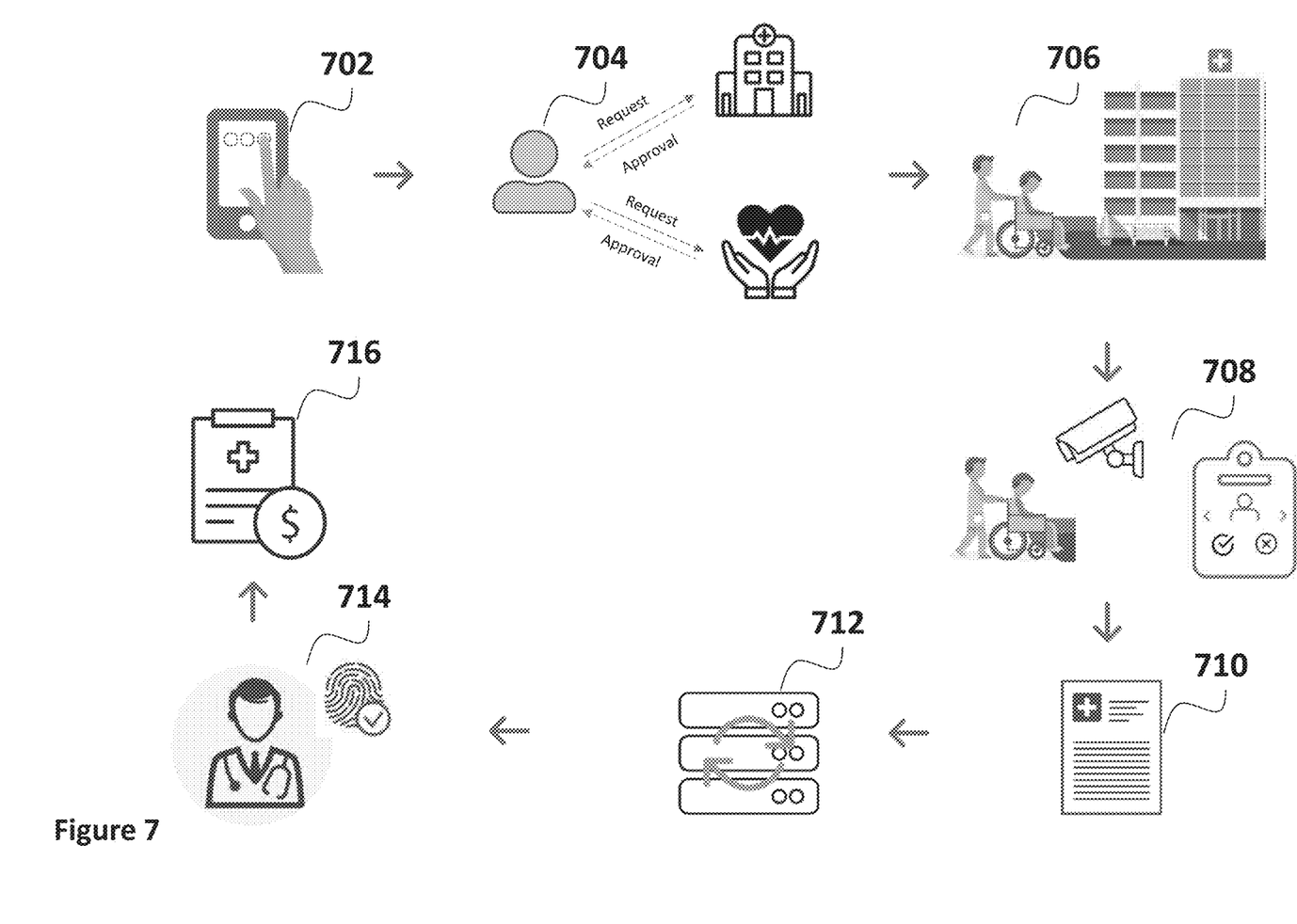
FIG. 7 illustrates a schematic flow diagram that shows the workflow in application of the authentication system in seamless patient journey and treatment monitoring for fraud-free claims.

FIG. 7 illustrates a schematic flow diagram that shows the workflow in application of the authentication system 200 in Seamless Patient journey and Treatment monitoring for fraud-free claims. As an example, the user pre-books service which is either in admission or an outpatient request on the client application 230 installed on the mobile phone, as referenced at 702. The request is received by the hospital insurer who provides an instant approval, as referenced at 704. Now the user or the patient arrives at the hospital, where instant admission and services are provided because the biometric identification was verified with the user data of the user using the authentication engine 140, as referenced at 706. The user's image is captured and verified against blocking request, where instant check-in is provided without any documentation, as referenced at 708. Now the file is automatically generated along with the location of room and the doctor, as referenced at 710. The patient's medical records are retrieved and synchronized using a Health Insurance Portability and Accountability Act (HIPAA) complaint patient data security, as referenced at 712. Now, the biometric authorization of the doctors and the medical staff is also performed before each process, as referenced at 714. Furthermore, continuous monitoring of treatments is performed on the user and related alerts are also sent to the user, as referenced at 716.

The client application 230 disclosed here offers a hardware independent platform agnostic solution with low integration and minimal setup costs for business customers and an ongoing per transaction billing. The client application 230 is, for example, a SaaS cloud-integrated mobile-based ultra-secure biometrics and financial data vault with modular user-controlled data access. Furthermore, the client application 230 is a mobile application with an ultra-secure encrypted vault linked with financial systems, identity databases, transaction/ticketing portals and retailers. The client application 230 provides comprehensive solution covering face, fingerprint, retina or eye, and voice-based biometrics. The client application 230 is a localized mobile-based vault with optional cloud storage. Users are enabled to provide modular access to information relevant to transaction partners which provides an encrypted data packet to the partner over the cloud whereas a dynamic decryption key is shared P2P. The partners do not require any hardware, in other words, a mobile, tablet or an HD camera linked to a personal computer (PC) is adequate for access control and the transaction services require only secure API integration. The client application 230 also provides artificial intelligence and machine learning (AI/ML) based solution based on advanced data analytics and direct DB integration.

The applications of the client application 230 associated with the authentication system 200 is as give below:

| | |
|---|---|
| Payments | The client application 230 is integrated with various payment gateways, wallets and other payment aggregators to authorize instant payments basis facial/fingerprint verification - both offline and online. |
| Secure Transactions | The client application 230 provides authentication by automatic teller machines (ATMs) and human tellers for withdrawals as well as securing online and offline payments done using cards. |
| Secure KYC | The client application 230 provides instant KYC by Financial Service Industry (FSI) driven by integration with Passport, Financial and identity systems. Instant form completion with all required information - can also be directly uploaded to FSIs account opening systems. |
| Visa and Immigration | The client application 230 provides mobile based biometrics capture. Integration with Passport, Identity, Ticketing, Lodging, Insurance and Payments systems. Instant form completion with all required information directly uploaded to the application systems. |
| Corporate Visitor Access | The client application 230 provides authenticated registration free access to corporate offices and complexes linked with calendar. Tracking and tracing of visitors across the facility in real time. |
| Office Access Control | The client application 230 provides rights-based access control to office areas for employees, consultants, service providers and visitors without cards. |
| Theaters and Concert Halls | The client application 230 provides ticketing integration and authenticated access for daily events such as movies, plays and concerts in small and mid-sized halls. BioPay integration for addon payments during the event. |
| Events - Sports, Music and Conventions | The client application 230 provides arena access control with ticketing integration for major sports and music events and various conventions. BioPay integration for in-arena spends. |
| Tourist and Religious Sites | The client application 230 provides authenticated access with ticketing integration at tourist and religious sites with BioPay based onsite payments. |
| Travel Hubs | The client application 230 provides access to Airports, Ports, Rail Stations, Bus Stations, Urban Transport (Bus, Tram, Metro and Ferries) with ticketing integration and instant verification for faster check-in and seamless boarding. Integrated with Visa/Passport for support at immigration at cross border hubs. BioPay integration for in-hub spends/on-board spends. |
| Hotels | The client application 230 provides direct room access for guests without requirement to check-in and room access through biometric locks. In-room and other hotel extras charged instantly using BioPay. |
| Service Provider Verification | The client application 230 provides verification of service providers by aggregators/employers as well as by customers (especially for in-home/onsite services) to prevent identity-spoofing. |

As will be appreciated by one of skill in the art, the present invention may be embodied as a method, system and apparatus. Accordingly, the present invention may take the form of an entirely hardware embodiment, a software embodiment or an embodiment combining software and hardware aspects.

It will be understood that each block of the block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

In the drawings and specification, there have been disclosed exemplary embodiments of the invention. Although specific terms are employed, they are used in a generic and descriptive sense only and not for purposes of limitation of the scope of the invention.

We claim:

1. A method for authenticating a registered user, the method comprising:
   registering a user by
      capturing at least one biometric of a user using a user device having storage;
      storing the at least one biometric in the storage on the user device;
      creating a unique biometric identification for the user in a biometric engine through algorithm processing of the at least one biometric of the user; and
      storing the unique biometric identification of the user in the storage on the user device, wherein the storage is in communication with the biometric engine via a client application;
   as required by the client application, linking the registered user with an identification document of the registered user by
      uploading the identification document for the registered user, wherein the identification document is a legally valid or government issued identification;
      verifying the identification document electronically against a source system associated with the identification document; and
      storing the identification document in the storage on the user device; and
   authenticating the registered user by
      receiving a request for an authentication of the registered user from the client application;
      accepting the request from the client application if the request matches the unique biometric identification;
      authenticating the registered user by capturing at least one biometric for the registered user and comparing the captured at least one biometric against the previously stored unique biometric identification of the registered user; and
      in response to the authentication of the registered user, generating an authentication message and sending the authentication message to the client application.

2. An authentication system to locally authenticate a registered user, the authentication system comprising:
   a user device having storage configured to capture at least one biometric of a user and store the at least one biometric in the storage on the user device;
   a biometric engine configured to create a unique biometric identification for the user through algorithm processing of the at least one biometric of the user, wherein the unique biometric identification is for registration of the user, wherein the storage is in communication with the biometric engine via a client application; and
   at least one processor coupled to a computer readable storage medium storing instructions, wherein when executed by the processor the instructions:
   as required by the client application, link the registered user with an identification document of the registered user by
      uploading the identification document for the registered user, wherein the identification document is a legally valid or government issued identification;

verifying the identification document electronically against a source system associated with the identification document; and storing the identification document in the storage on the user device; and authenticate the registered user by receiving a request for an authentication of the registered user from the client application, accepting the request from the client application if the request matches the unique biometric identification;

authenticating the registered user by capturing at least one biometric for the registered user and comparing the captured at least one biometric against the previously stored unique biometric identification of the registered user, and generate an authentication message that is sent to the client application if the registered user is authenticated.

3. A non-transitory computer program product to locally authenticate a user, when executed by a computer, the computer program product causes the computer to:

register a user by capturing at least one biometric of a user using a user device having storage;

storing the at least one biometric in the storage on the user device;

creating a unique biometric identification for the user in a biometric engine through algorithm processing of the at least one biometric of the user; and storing the unique biometric identification of the user in the storage on the user device, wherein the storage is in communication with the biometric engine via a client application;

as required by the client application, link the registered user with an identification document of the registered user by uploading the identification document for the registered user, wherein the identification document is a legally valid or government issued identification;

verifying the identification document electronically against a source system associated with the identification document; and storing the identification document in the storage on the user device; and authenticate the registered user by receiving a request for an authentication of the registered user from the client application;

accepting the request from the client application if the request matches the unique biometric identification;

authenticating the user by capturing at least one biometric for the registered user and comparing the captured at least one biometric against the previously stored unique biometric identification of the registered user; and in response to the authentication of the user, generating an authentication message and sending the authentication message to the client application.

4. The method of claim 1, wherein the at least one biometric includes at least a subset of face, eye socket, voice, palm and finger.

5. The system of claim 2, wherein the at least one biometric includes at least a subset of face, eye socket, voice, palm and finger.

6. The non-transitory computer program product of claim 3, wherein the at least one biometric includes at least a subset of face, eye socket, voice, palm and finger.

* * * * *